United States Patent [19]

Kokubo

[11] Patent Number: 5,328,278
[45] Date of Patent: Jul. 12, 1994

[54] PRINTING APPARATUS FOR PRINTING DATA BASED ON INPUT PROGRAM

[75] Inventor: Masatoshi Kokubo, Nagoya, Japan

[73] Assignee: Brother Kogyo Kabushiki Kaisha, Nagoya, Japan

[21] Appl. No.: 51,563

[22] Filed: Apr. 23, 1993

[30] Foreign Application Priority Data

Jul. 28, 1992 [JP] Japan .................. 4-201432

[51] Int. Cl.⁵ ............................ B41J 29/38
[52] U.S. Cl. ........................ 400/74; 400/76; 395/114
[58] Field of Search ........... 400/61, 74, 76, 70; 371/21.1; 395/114

[56] References Cited

U.S. PATENT DOCUMENTS 4,616,946 10/1986 Murata et al. ................. 400/704
4,968,159 11/1990 Sasaki ........................... 400/76

FOREIGN PATENT DOCUMENTS 225943 11/1985 Japan ................................ 400/76
229780 11/1985 Japan ................................ 400/76
2231421A 11/1990 United Kingdom ............. 400/74

Primary Examiner—David A. Wiecking
Assistant Examiner—Steven S. Kelley
Attorney, Agent, or Firm—Oliff & Berridge

[57] ABSTRACT

A printing apparatus offering high reliability by improving the rate of detecting errors in a control program supplied externally and by pointing out where the errors exist in the program. The apparatus comprises a data receiver, a flash memory, a CPU and a display unit. In operation, the apparatus receives the control program and a check program from a host computer through the data receiver. The control program defines the way the apparatus operates, and the check program is used to verify the performance of the control program. The two programs when received, are stored into the flash memory. The CPU then checks the control program for performance in accordance with the check program. The result of the check is displayed on the display unit.

20 Claims, 7 Drawing Sheets

Fig. 3(b)

|  | START |
|---|---|
| S1: | INITIALIZE |
| S2: | RECEPTION OF CONTROL PROGRAM REQUESTED? |
| S3: | PREPARE TO RECEIVE CONTROL PROGRAM |
| S4: | RESULT OF CHECKING HEADER BLOCK OF CONTROL PROGRAM OK? |
| S5: | RESULT OF COLLATING CHECK SUM WITH RECEIVED CODES OF CONTROL PROGRAM OK? |
| S6: | STORE CHECKED BLOCK INTO FLASH MEMORY |
| S7: | ALL BLOCKS RECEIVED? |
| S8: | PREPARE TO RECEIVE CHECK PROGRAM |
| S9: | RESULT OF CHECKING HEADER BLOCK OF CHECK PROGRAM OK? |
| S10: | RESULT OF COLLATING CHECK SUM WITH RECEIVED CODES OF CHECK PROGRAM OK? |
| S11: | STORE CHECKED BLOCK INTO FLASH MEMORY |
| S12: | ALL BLOCKS RECEIVED? |
| S13: | CHECK OF CONTROL PROGRAM REQUESTED? |
| S14: | EXECUTING CHECK PROGRAM RESULT IN ERROR? |
| S15: | EXECUTE CONTROL PROGRAM |
| S20: | DISPLAY ERROR MESSAGE |
|  | END |

Fig. 4(b)

|      | START |
| ---- | ----- |
| S41: | INITIALIZE |
| S42: | SET TRAP CONDITION AND TRAP VECTOR |
| S43: | START CONTROL PROGRAM |
| S44: | TRAP GENERATED? |
| S45: | INPUT CONTROL COMMAND AND SET TRAP CONDITION AND TRAP VECTOR (INTERRUPT HANDLING) |
| S46: | EXECUTE CONTROL COMMAND AS PER CONTROL PROGRAM |
| S47: | GENERATE TRAP |
| S48: | COLLATE RESULT OF EXECUTION WITH DATABASE VALUE (INTERRUPT HANDLING) |
| S49: | ERROR? |
| S50: | ENTER CONTROL COMMAND INTO ERROR TABLE |
| S51: | ALL COMMANDS CHECKED? |
| S52: | DATA IN ERROR TABLE? |
| S53: | INFORM ERROR INFORMATION AND ERROR TABLE ADDRESS |
| S54: | INFORM NORMAL END INFORMATION |
|      | END |

PRINTING APPARATUS FOR PRINTING DATA BASED ON INPUT PROGRAM

BACKGROUND OF THE INVENTION

1. Field of the Invention

The invention relates to a printing apparatus that prints out data received from an external device such as a host computer. More particularly, the invention relates to a printing apparatus that operates on a control program received from the external device, the program designating the manner in which the apparatus is to run.

2. Description of the Related Art

The typical prior art printing apparatus comprises a controller such as a microcomputer that controls the apparatus in printing data received from an external device. The control program of the microcomputer is generally stored in a read-only nonvolatile memory (ROM). The controller of the printing apparatus always works in accordance with this control program.

Recent years have seen growing diversification of external devices, such as host computers, for connection with the printing apparatus. Along with the trend has come the demand for connecting the printing apparatus to these diverse kinds of external devices. The demand is being met by some recently developed printing apparatuses whose read-only nonvolatile memory (ROM) contains only basic programs for start-up and data reception control; a control program for telling the apparatus specifically how to print is received from the outside source and held in an internal writable memory (RAM or flash memory). The two kinds of control programs combine to control the way the printing apparatus operates.

The externally supplied control programs are of dedicated types, each addressing the character code or control code system of a specific external device. Under this scheme, any one of the diverse external devices may be connected to the printing apparatus without the bothersome task of replacing the ROM in the latter.

Printing apparatuses whose internal ROM accommodates all necessary control programs can be thoroughly checked for performance in the assembly stage since their performance depends on the stored control programs. Such a check for performance control cannot be made in the assembly stage on those printing apparatuses that are designed to receive control programs from an external device, for storage into the internal writable memory, and then operate in accordance therewith. In this respect, what is important for the printing apparatus whose control program is supplied externally is to check whether the control program is normally received and stored into the writable memory of the apparatus. Conventionally, that check is carried out upon program reception through verification of the check sums inserted in the control program.

The disadvantage of the above check sum verification is manifold. Because the verification is merely a check on program codes, it reveals far fewer errors in the control program than the check made in the assembly stage. The check sum verification cannot be performed while the control program is being run. In addition, it is difficult to isolate the suspected portion of the program indicated by any error detected, hence a virtual inability to correct the error. This connotes that if the control program is found to be erroneously stored, the only way to correct the problem is to again input the control program from the outside source or device.

SUMMARY OF THE INVENTION

It is therefore an object of the invention to overcome the above and other deficiencies and disadvantages of the prior art and to provide a printing apparatus that offers high reliability by improving the rate of detecting errors in the externally supplied control program and by isolating the erroneous parts in the control program.

In carrying out the invention and according to one aspect thereof, there is provided a printing apparatus for receiving data output by an external device and for performing printing based on the received data, the printing apparatus comprising: reception means for receiving a control program and a check program, the control program defining the manner in which the printing apparatus is to operate, the check program verifying the performance of the control program; storage means for storing the received control program and check program; central processing means for reading from the storage means the control program and the check program so as to control the whole printing apparatus in accordance with any one of the two programs; and display means for displaying the result of the check on the control program performed in accordance with the check program.

The printing apparatus of the above constitution receives, through the reception means, the control program and the check program, both output by the external device. The received programs are stored in the storage means inside the printing apparatus. The central processing means of the apparatus executes and verifies the control program stored in the storage means in accordance with the check program also stored in the storage means. In the case where an error is detected, the central processing means analyzes the nature of the error, isolates the erroneous part of the program, and displays that part on the display means. The scheme makes it possible to readily check and correct the control program held in the storage means inside the printing apparatus.

These and other objects, features and advantages of the invention will become more apparent upon a reading of the following description in connection with the appended drawings.

BRIEF DESCRIPTION OF THE DRAWINGS

A preferred embodiment according to the invention will now be described with reference to the accompanying drawings in which.

DESCRIPTION OF THE PREFERRED EMBODIMENT

Figure 1:
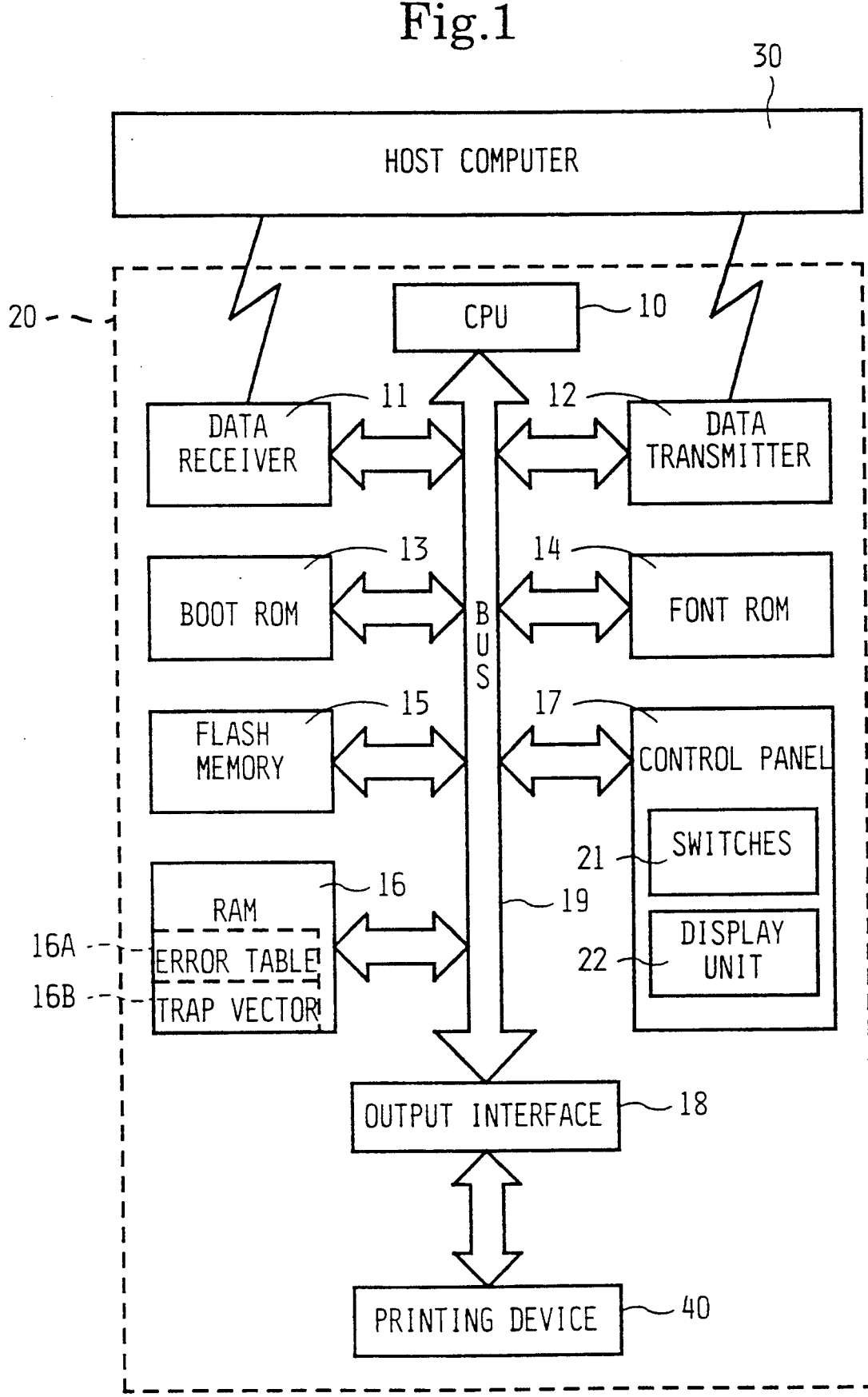
FIG. 1 is a block diagram of a printing apparatus embodying the invention.

FIG. 1 is a block diagram of a printing apparatus embodying the invention. In FIG. 1, a host computer 30 is an external device that transfers, to a printing apparatus 20, output data, a control program 50 and a check program 60 (the programs will be described later).

The printing apparatus 20 comprises a CPU 10 that works as the central processing means according to the invention, a data receiver 11 that acts as the reception means of the invention, a data transmitter 12, a boot ROM 13, a font ROM 14, a flash memory 15 that operates as the storage means according to the invention for accommodating the control program and check program, a RAM 16, a control panel 17, and an output interface 18. These components are interconnected via a bus 19. The output interface 18 is connected with a printing device 40 that performs print output.

The boot ROM 13 is a read-only memory that stores basic programs defining the protocols for activating the printing apparatus upon power-up and for receiving the control program 50 and check program 60 from the host computer 30.

The CPU 10 controls the whole printing apparatus in accordance with the basic programs as well as with the control program 50 or with the check program 60. The data receiver 11 is an interface which, under control of the CPU 10, receives output data, the control program 50 or the check program 60 from the host computer 30. The data transmitter 12 is an interface that transmits, also under control of the CPU 10, data from the printing apparatus 20 to the host computer 30.

The font ROM 14 retains shape data on various characters and character code information. The RAM 16 provides a work area for use by the CPU 10 and areas in which to develop the images of print data. The print data developed in the RAM 16 are printed onto a printing medium by the printing device 40 via the output interface 18. The control panel 17 has switches 21 and a display unit 22. The switches 21 are used to establish various settings of the printing apparatus 20 such as on-line/off-line switchover. The display unit 22 displays the internal status of the printing apparatus 20 or the result of the check performed.

The flash memory 15 is a writable nonvolatile memory that stores the control program 50 and the check program 60 transferred from the host computer 30 through the data receiver 11. The flash memory 15 may be partially or fully replaced by a RAM or a magnetic substance memory. Although the embodiment is structured to let one flash memory 15 act as both a memory for storing the control program 50 and as a memory for storing the check program 60, there is an alternative to this arrangement. That is, the control program 50 may be stored in the writable nonvolatile memory (flash memory), while the check program 60, which need not reside in the printing apparatus after the check, may be placed in a writable volatile memory (i.e., RAM). This arrangement reduces the required capacity of the relatively expensive writable nonvolatile memory.

Figure 2:
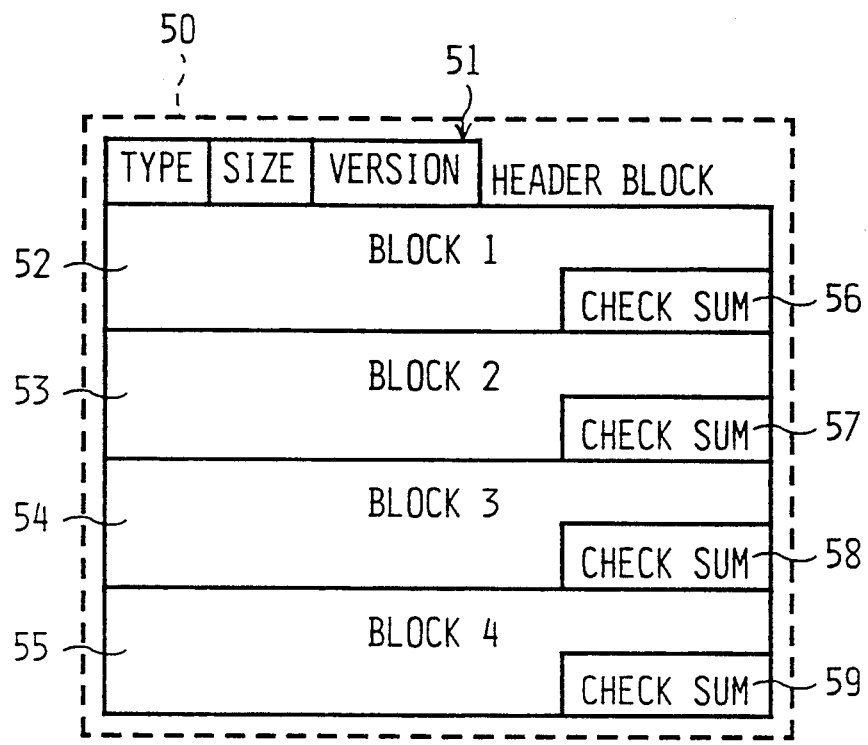
FIG. 2(a) is a view showing an internal structure of a typical control program supplied from external to the printing apparatus in the embodiment.
FIG. 2(b) is a view depicting an internal structure of a typical check program supplied from external to the printing apparatus in the embodiment.
Figure 2:
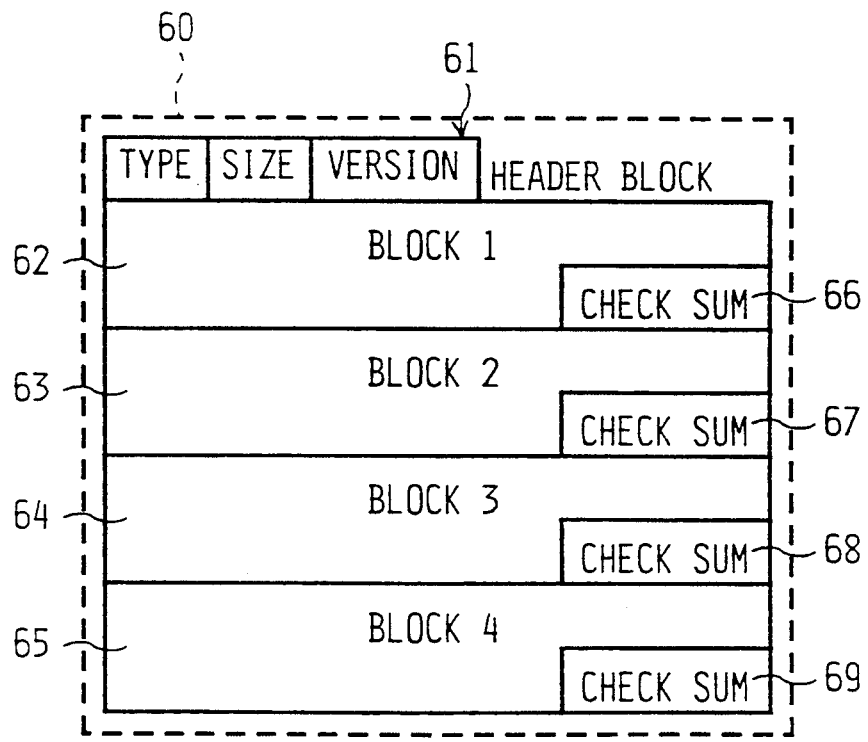

FIG. 2(a) is a view of a typical internal structure of the control program 50 transferred from the host computer 30 to the printing apparatus 20 embodying the invention. FIG. 2(b) is a view of a typical internal structure of the check program 60 also transferred from the host computer 30 to the printing apparatus 20.

The control program 50 controls the performance of the printing apparatus 20. This program is provided for each different host computer 30 connected to the printing apparatus 20, or for each different set of character codes or control codes of the data transferred from the host computer 30 to the printing apparatus 20. The check program 60, corresponding to each control program 50, defines the steps in which to check the control program while the latter is running.

The control program 50 is provided with a header block 51 and the check program 60, with a header block 61. The header block indicates the type, size and version of the program. The header block 51 or 61 is followed by a program code portion divided into blocks of an appropriate size. Blocks 52 through 55 or 62 through 65, in FIGS. 2(a) and 2(b), have check sums 56 through 59 or 66 through 69 inserted therein respectively, each check sum being calculated from the data within each block.

Upon receipt of the control program 50 or check program 60, the printing apparatus 20 collates the check sums of the received data with the check sums 56 through 59 or 66 through 69 inserted in these programs. The collation allows the printing apparatus 20 to judge whether the program is normally received. It will be appreciated that either of the control program 50 and check program 60 may be included in the other program.

Figure 3:
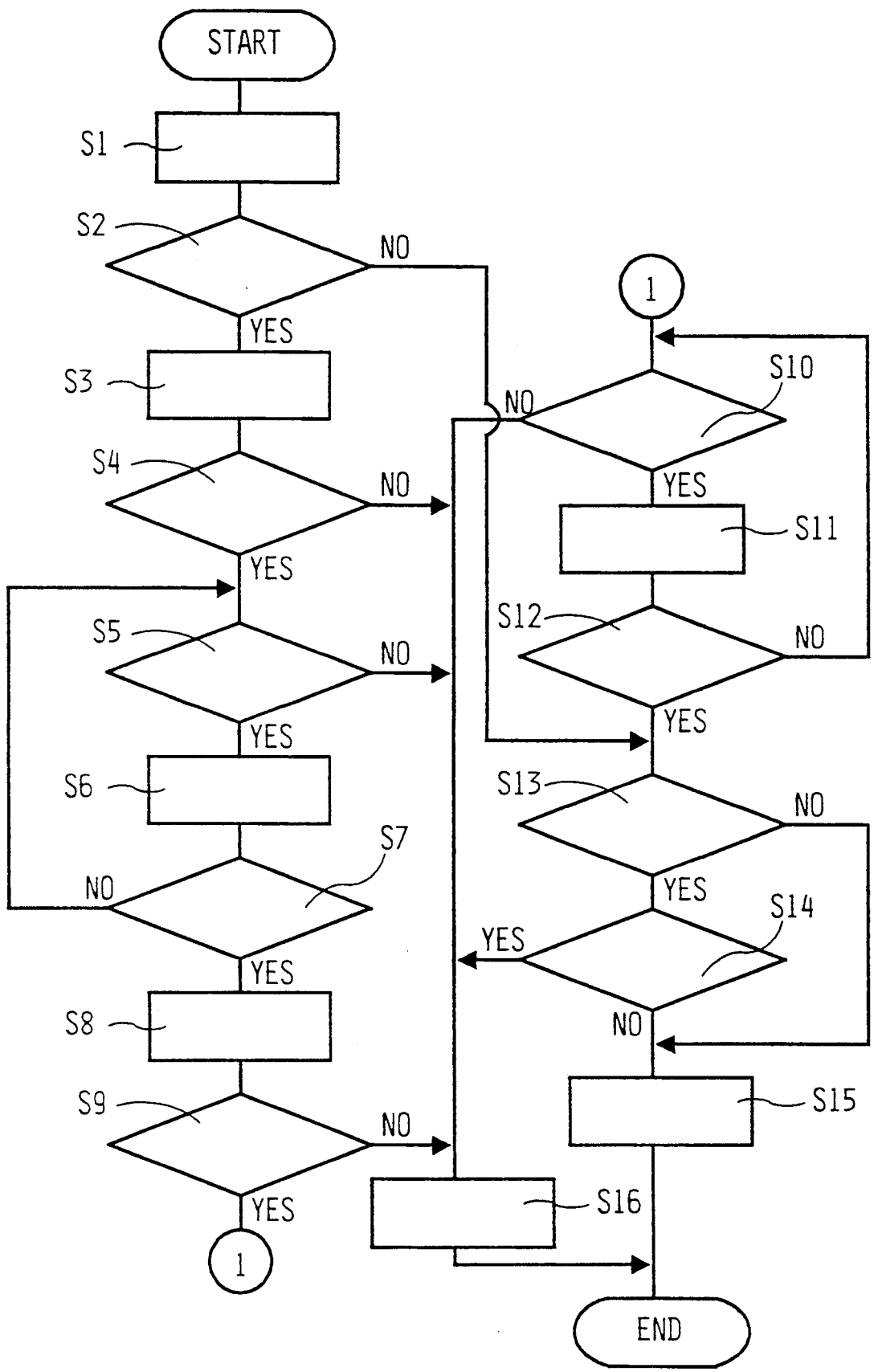
FIG. 3(a) is a flowchart of steps performed by the printing apparatus in the embodiment.
FIG. 3(b) is a table of labels for FIG. 3(a)

FIG. 3 is a flowchart of the steps that the embodiment performs when operating. In FIG. 3, applying power to the printing apparatus 20 starts up the apparatus in accordance with the basic program stored in the boot ROM 13. In step 1, the components of the printing apparatus 20 are initialized. That is, the work area in the RAM 16 is cleared; any display data that may be present are erased from the display unit 22 of the control panel 17; and the data receiver 11, data transmitter 12, output interface 18 and printing device 40 are all initialized.

In step 2, the printing apparatus 20 displays a message on the display unit 22 of the control panel 17, prompting the operator to decide whether or not to accept the control program 50 for reception. The apparatus waits for an operator input through the switches 21 of the control panel 17. Alternatively, this decision can be made automatically in accordance with the presence or absence of the control program 50 in the flash memory 15. If the control program 50 is rejected, step 13 is reached. If the control program 50 is accepted for reception, step 3 is reached. In step 3, the CPU 10 controls the data receiver 11 in preparation for data reception from the host computer 30.

When the host computer 30 starts transmitting the control program 50, step 4 is reached. In step 4, the CPU 10 checks the header block 51 of the control program 50 being received through the data receiver 11. If an error is detected in the header block 51, step 16 is reached. In step 16, an appropriate error message is displayed on the display unit 22.

If the header block 51 is found to be received normally in step 4, step 5 is reached for successive reception of the program code portion in the control program 50. During the reception, checks are made from time to time to see if the data are normally transmitted. That is, the check sum in the code portion of each received block is collated with the corresponding check sum (56 through 59) inserted in the control program 50. If the current block of the control program 50 has been transferred normally, step 6 is reached. In step 6, that block of the control program 50 is stored into the flash memory 15. In step 7, a check is made to see if all blocks have been transferred. The process is repeated until all blocks have been transferred. If a check sum error is detected in step 5, step 16 is reached in which an appropriate error message is displayed on the display unit 22.

When the control program 50 has been normally received and stored into the flash memory 15, step 8 is reached. In step 8, the CPU 10 controls the data receiver 11 in preparation for receiving the check program 60 from the host computer 30.

When the host computer 30 starts transmitting the check program 60, step 9 is reached. In step 9, the CPU 10 checks the header block 61 of the check program 60 being received through the data receiver 11. If an error is detected in the header block 61, step 16 is reached. In step 16, an appropriate error message is displayed on the display unit 22.

If the header block 61 is found to be received normally in step 9, step 10 is reached for successive reception of the program code portion in the check program 60. During the reception, checks are made from time to time to see if the data are normally transmitted. That is, the check sum in the code portion of each received block is collated with the corresponding check sum (66 through 69) inserted in the check program 60. If the current block of the check program 60 has been transferred normally, step 11 is reached. In step 11, that block of the check program 60 is stored into the flash memory 15. In step 12, a check is made to see if all blocks have been transferred. The process is repeated until all blocks have been transferred. If a check sum error is detected in step 10, step 16 is reached in which an appropriate error message is displayed on the display unit 22.

When the control program 50 and the check program 60 have been received normally, step 13 is reached. In step 13, the printing apparatus 20 displays a message on the display unit 22 of the control panel 17, prompting the operator to decide whether or not to check the control program 50. The apparatus waits for an operator input through the switches 21 of the control panel 17. If the operator decides not to check the control program 50, step 15 is reached. Alternatively, step 13 may be omitted so that the control program 50 is always checked. If the operator decides to check the control program 50, step 14 is reached. In step 14, the CPU 10 reads the check program 60 from the flash memory 15 and executes the program.

If the execution of the check program 60 in step 14 results in an error, step 16 is reached in which an appropriate error message is displayed on the display unit 22. If no error is detected in step 14, step 15 is reached. In step 15, the control program 50 in the flash memory 15 is executed for control of the printing apparatus 20. When an error is detected, the host computer 30 may be notified thereof through the data transmitter 12 instead of the error message being displayed on the display unit 22. Further, it will be appreciated that the check program 60 may be received first, followed by the control program 50.

Figure 4:
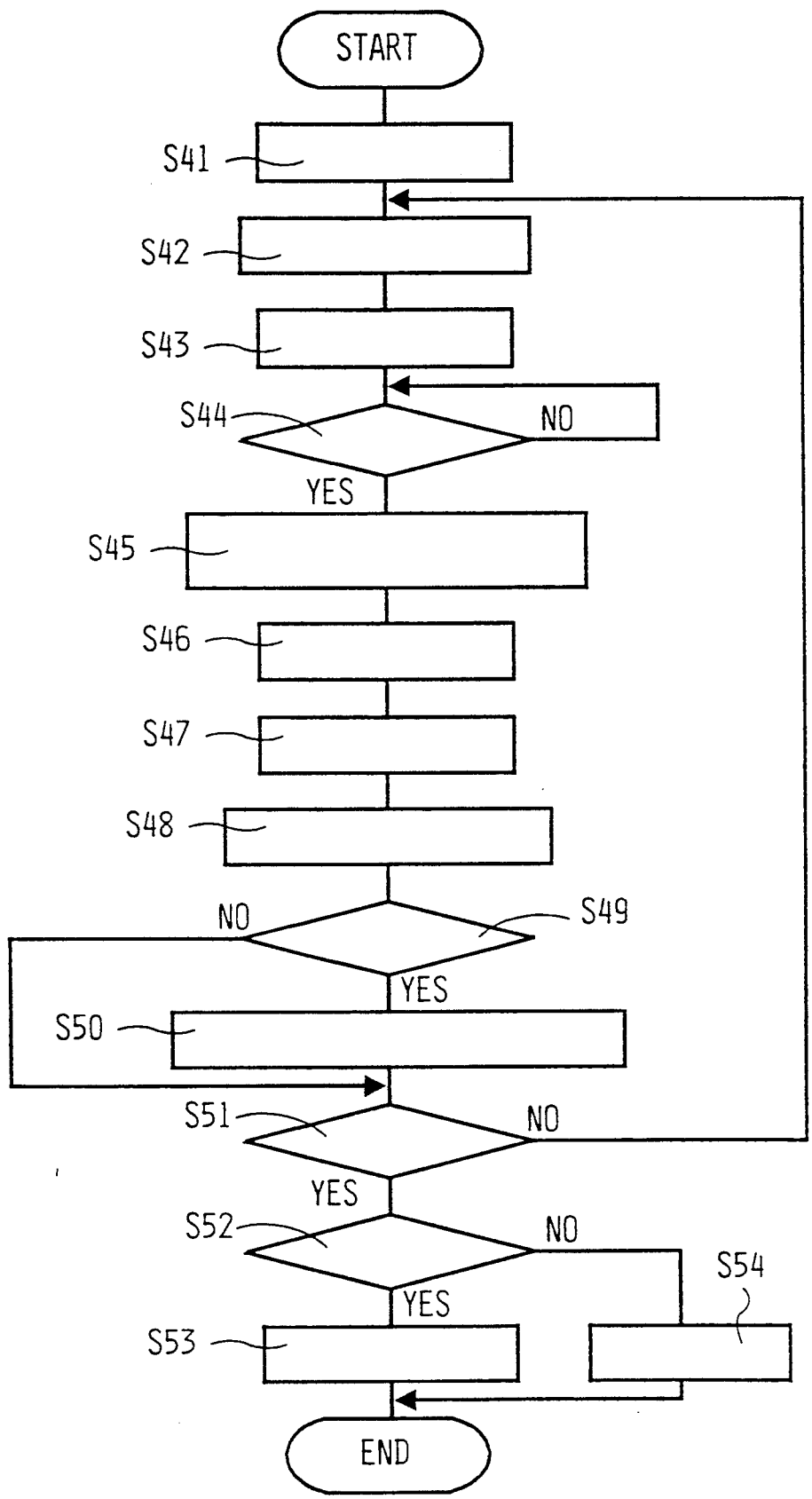
FIG. 4(a) is a flowchart of steps performed by the check program for use in the printing apparatus in the embodiment.
FIG. 4(b) is a table of labels for FIG. 4(a)

FIG. 4 is a flowchart of steps performed by the check program 60 for use with the embodiment. This flowchart provides a more detailed explanation of what takes place in step 14 of FIG. 3.

In FIG. 4, the CPU 10 starts operating in accordance with the check program 60. In step 41, initialization is carried out and the necessary environment is established for execution of the check program 60. The initialization process of step 41 includes allocation of a work area needed to execute the check program 60, acquisition of the information about the environment such as the internal information of the font ROM 14 necessary for performance check, generation of a database for accommodating such information, initialization of an error table for storing erroneous commands detected upon check, and initialization of a trap vector. In step 42, trap generating conditions and the trap vector are set for the CPU 10 so that the CPU 10 will generate a trap while a data input from the external device is being awaited following the start-up of the control program 50, whereby control is passed on to the check program 60.

In step 43, the control program 50 is started. In step 44, a check is made to see if the CPU 10 has entered a state that meets the trap generating conditions set in step 42. If a trap is found to be generated in step 44, step 45 is reached. In step 45, the CPU 10 passes control to the check program 60 in accordance with the trap vector, thereby initiating interrupt handling. During interrupt handling, the command designated by the check program 50 is input to the control program 50. Conditions are set for the CPU 10 in such a manner that a trap will occur at the end of the execution of the command by the control program 50. Suppose that the check program 60 checks to see if a font selection command in the control program 50 works normally. In that case, the conditions are set as follows: the font selection command is first written to an input buffer of the control program 50. The control program 50 then executes the font selection command to acquire address information about the applicable font in the font ROM 14. When the address information is acquired, the CPU 10 generates a trap.

In step 46, the CPU 10 terminates the interrupt handling performed in accordance with the check program 60 and resumes processing according to the control program 50. The CPU 10 executes the command that was input to the control program 50 in step 45. When the trap conditions set in step 45 are met during command execution, a trap is again generated in step 47. Control is then transferred to the check program 60 for interrupt handling.

In step 48, the check program 60 acquires the result of the command execution and collates the result with the corresponding data in the database generated in step 41. In step 49, a check is made to see if any error is detected from the collation in step 48. In the above example, involving the font selection command, the address information obtained by the control program 50 executing the font selection command is collated with the address in the font ROM 14 which corresponds to the applicable font stored in the database. In case of an error in step 49, step 50 is reached. In step 50, the erroneous command is entered into the error table. If no error is detected in step 49, step 51 is reached in which a check is made to see if all target commands have been checked. The process is repeated until all the commands have been checked.

Step 51 is followed by step 52 in which a check is made to see if the error table contains any error commands. If an error command is detected in the error table, error generation information and the error table address are returned in step 53. This indicates clearly which command(s) is erroneous in the control program 50 stored in the flash memory 15 of the printing apparatus 20. With its erroneous parts thus made clear, the control program 50 is readily corrected. If no erroneous command is found in the error table, normal end information is returned in step 54.

Figure 5:
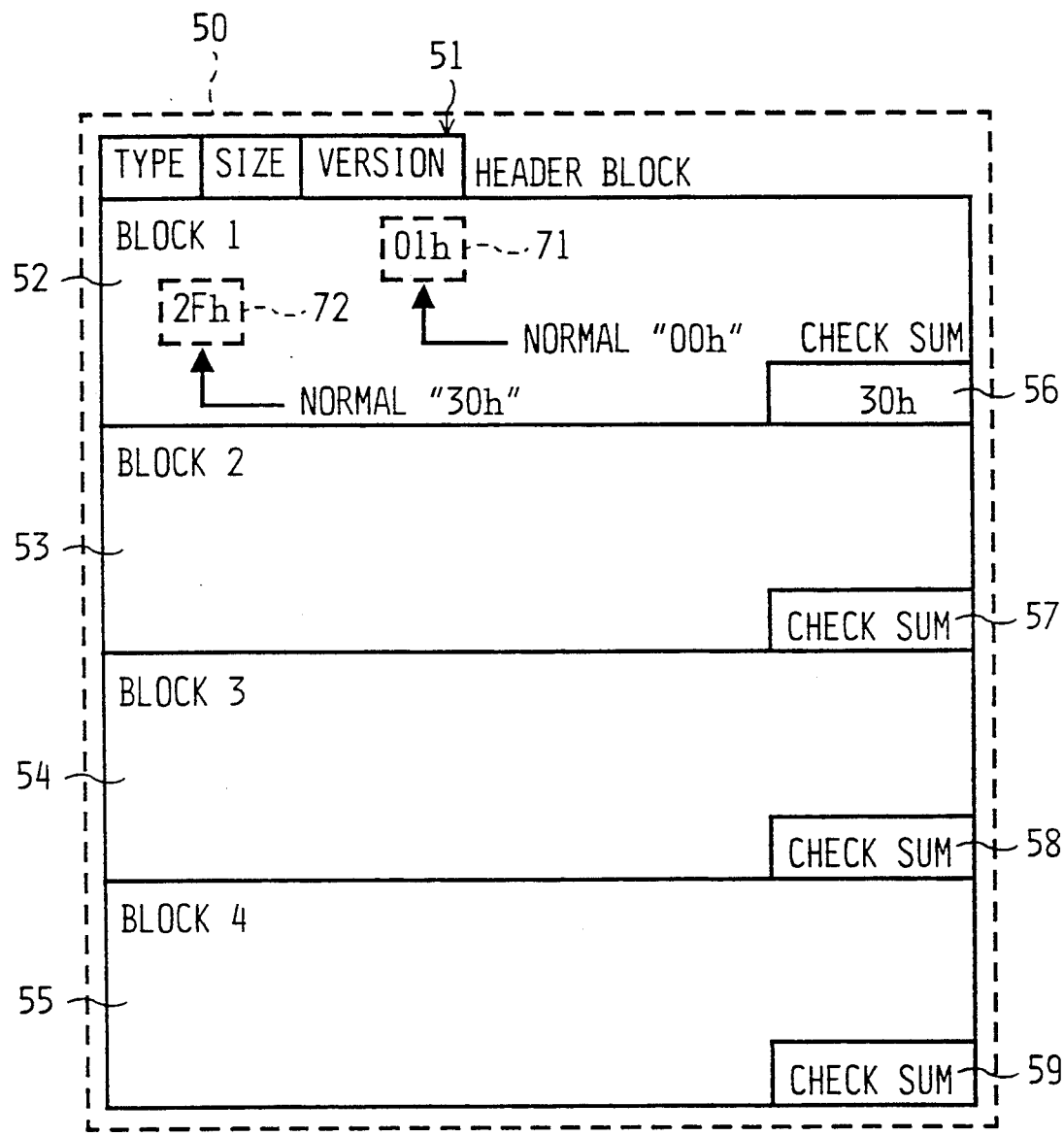
FIG. 5 is a view showing an example in which errors cannot be detected in a control program through conventional check sum verification.

The conventional check sum verification fails to detect errors illustratively in the following case. Suppose that block 1 (52) of the control program 50, shown in FIG. 5, has two errors: a portion 71 containing "01h" instead of the normal "00h" (h denotes hexadecimal notation), and a portion 72 containing "2Fh" instead of the normal "30h." In this case, the sum of the codes in block 1 becomes equal to the check sum added to block 1, which prevents the errors from being detected. Despite the apparent normalcy, the command relying on this partially defective program fails to work properly. Conventionally, there is no way to find the cause of the failure from outside the printing apparatus. By contrast, the invention embodied as the printing apparatus is capable of isolating the command that fails in the above manner and of clarifying the cause of the failure.

As described, the printing apparatus according to the invention improves the rate of detecting errors in the control program input from the outside for storage inside, and points out where the errors exist in the program. This makes it easy to correct the erroneous control program, thereby improving the reliability of the printing apparatus.

As many apparently different embodiments of this invention may be made without departing from the spirit and scope thereof, it is to be understood that the invention is not limited to the specific embodiments thereof except as defined in the appended claims.

I claim:

1. A printing apparatus for receiving data output by an external device and for performing printing based on the received data, the printing apparatus comprising:
    reception means for receiving a control program and a check program, the control program defining the manner by means of a plurality of control commands in which the printing apparatus is to operate, the check program verifying the performance of the control program;
    storage means for storing the received control program and check program;
    processing means for reading from the storage means the control program and the check program so as to control the printing apparatus based on the control program after executing the check program;
    working memory means for storing data used for control of the printing apparatus by said processing means; and
    informing means for informing an operator of the result of the check on the control program performed in accordance with the check program.

2. The printing apparatus as claimed in claim 1, further comprising a trap vector for storing an address from which the check program is executed for verifying the performance of the control program.

3. The printing apparatus as claimed in claim 2, wherein said processing means executes a control command of the control program, the control command executed by said processing means is indicated by the check program.

4. The printing apparatus as claimed in claim 3, wherein said working memory means contains an error table for storing data of the control command that has executed erroneously and said informing means includes a display means for displaying data corresponding to the data stored in said error table.

5. The printing apparatus as claimed in claim 3, wherein said working memory means contains a data base for storing data of conditions of the printing apparatus and said processing means collates data resulting from execution of a control command of a control program with data corresponding to the data base.

6. The printing apparatus as claimed in claim 1, wherein said storage means is a non-volatile memory.

7. The printing apparatus as claimed in claim 6, wherein said storage means further includes a volatile memory, the control program being stored in the non-volatile memory and the check program being stored in the volatile memory.

8. A method for controlling a printing apparatus, comprising the steps of:
    transferring a control program from a host computer to the printing apparatus;
    checking whether the control program has been properly received;
    transferring a check program from the host computer to the printing apparatus;
    checking whether the check program has been properly received;
    executing the check program to determine if the control program has been accurately received; and
    executing the control program to print data provided to the printing apparatus after executing the check program.

9. The method as claimed in claim 8, wherein the step of checking the control program comprises the step of checking to determine whether a header block, which is included in the control program and specifies the control program, was properly received.

10. The method as claimed in claim 9, wherein the step of checking the control program further comprises the step of verifying on a block by block basis whether the control program has been properly received.

11. The method as claimed in claim 10, wherein the step of checking whether the check program has been properly received comprises the step of checking to determine whether a header block, which is included in the check program and specifies the check program, was properly received.

12. The method as claimed in claim 11, wherein the step of checking the check program further comprises the step of verifying on a block by block basis whether the check program has been properly received.

13. The method as claimed in claim 8, wherein the step of executing the check program comprises the steps of:
    initializing the printing apparatus;
    establishing a trap condition and a trap vector;
    initiating the control program;
    determining if a trap is generated;
    initiating interrupt handling when a trap is generated;
    executing a control command in accordance with the control program;
    establishing a subsequent trap condition and a subsequent trap vector;
    collating the result of the control command execution with corresponding data in a data base having data of correct results of each control command execution;
    checking whether a discollation has occurred;

entering data of the control command into an error table when the discollation has occurred;

determining if all control commands have been checked;

determining whether data exists in the error table; and providing an output of data in the error table.

14. The method as claimed in claim 13, wherein the establishing a trap condition and a trap vector through the entering data of the control command into the error table steps are repeated until all control commands have been checked.

15. The method as claimed in claim 13, wherein the initializing the printing apparatus step comprises:
   allocating work area needed to execute the check program;
   acquiring information about a printer environment necessary for performance checks such as internal information from a font ROM storing data indicating each character;
   generating a data base for storing such information;
   initializing an error table; and
   initializing the trap vector.

16. A printing apparatus, comprising:
   means for transferring a control program from a host computer to the printing apparatus;
   means for checking whether the control program has been properly received;
   means for transferring a check program from the host computer to the printing apparatus;
   means for checking whether the check program has been properly received;
   means for executing the check program to determine if control program has been accurately received; and
   means for executing the control program to print data provided to printing apparatus after executing the check program.

17. The printing apparatus as claimed in claim 16, wherein the means for checking the control program further comprises means for checking to determine whether the header block, which is included in the control program and specifies the control program, was properly received and means for verifying on a block by block basis whether the control program has been properly received.

18. The printing apparatus as claimed in claim 16, wherein the means for executing the check program further comprises:
   means for initializing the printing apparatus;
   means for establishing a trap condition and a trap vector;
   means for initiating the control program;
   means for determining if a trap is generated;
   means for initiating interrupt handling when a trap is generated;
   means for executing a control command in accordance with the control program;
   means for establishing a subsequent trap condition and a subsequent trap vector;
   means for collating the result of the control command execution with corresponding data in a data base having data of correct results of each control command execution;
   means for checking whether a discollation has occurred;
   means for entering data of the control command into an error table when the discollation has occurred;
   means for determining if all control commands have been checked;
   means for determining whether data exists in the error table; and
   means for providing an output of data in the error table.

19. The printing apparatus as claimed in claim 18, wherein the means for establishing the trap condition and trap vector through the means for entering data of the control command into the error table actions are repeated until all control commands have been checked.

20. The printing apparatus as claimed in claim 18, wherein the means for initializing the printing apparatus comprises:
   means for allocating work area needed to execute the check program;
   means for acquiring information about a printer environment such as internal information from a font ROM storing data indicating each character necessary for performance checks;
   means for generating a data base for storing such information;
   means for initializing an error table; and
   means for initializing the trap vector.

* * * * *